(No Model.)
G. L. McCALLUM.
MILK PAIL.
No. 562,734. Patented June 23, 1896.
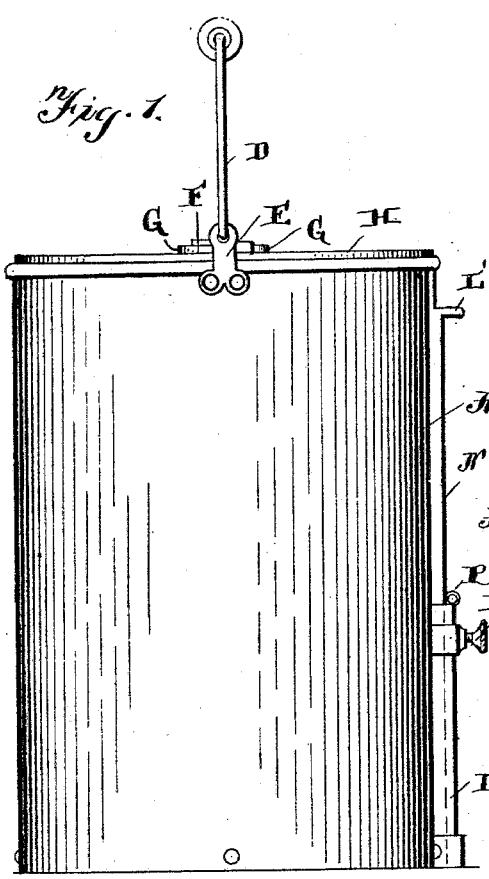
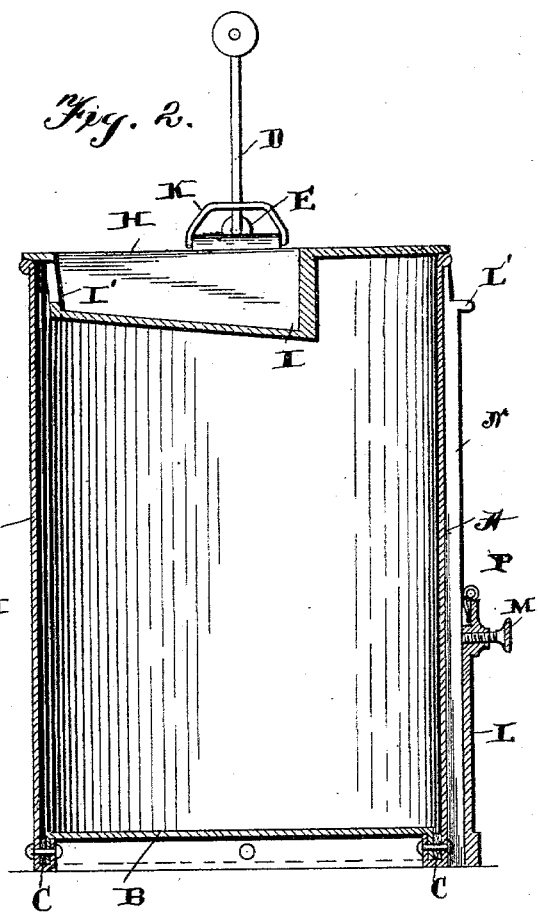
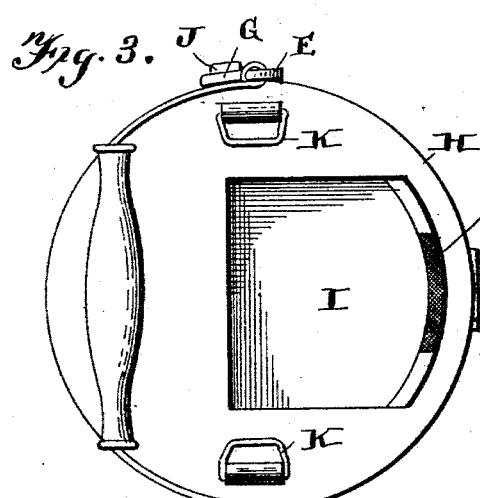
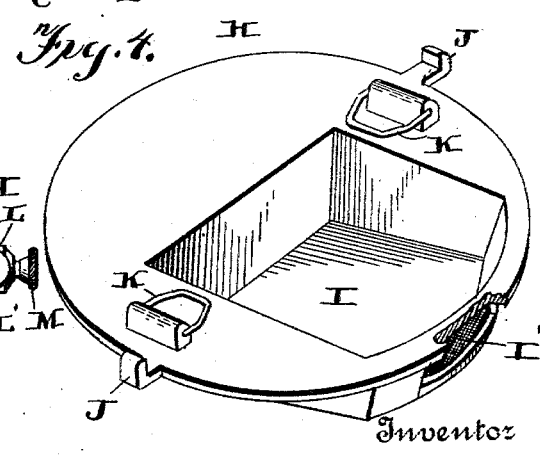
Witnesses
Geo. E. Trich
James W. Bevans
Inventor
Geo. L. McCallum
By Pattison & Nesbit,
Attorneys

UNITED STATES PATENT OFFICE.

GEORGE L. McCALLUM, OF NEWERF, PENNSYLVANIA.

MILK-PAIL.

SPECIFICATION forming part of Letters Patent No. 562,734, dated June 23, 1896.

Application filed September 10, 1895. Serial No. 562,076. (No model.)

*To all whom it may concern:*

Be it known that I, GEORGE L. MCCALLUM, of Newerf, in the county of McKean and State of Pennsylvania, have invented certain new and useful Improvements in Milk-Pails; and I do hereby declare the following to be a full, clear, and exact description of the invention, such as will enable others skilled in the art to which it pertains to make and use it, reference being had to the accompanying drawings, which form part of this specification.

This invention has reference to milk-pails, and has for its object the provision of an improved cover and strainer for pails of the character described, and also an improved adjustable support therefor.

With these objects in view the invention consists in the novel features of construction hereinafter fully described and claimed, and illustrated by the accompanying drawings, in which—

Figure 1 is a side elevation of the milk-pail. Fig. 2 is a vertical sectional view of the same. Fig. 3 is a plan view. Fig. 4 is a detail perspective view of the cover.

A designates the side walls of the pail, and B the bottom, which is reinforced by the ring or strengthening-hoop C.

D is the handle, secured to opposite sides of the upper end of the pail by ears E, and projecting from each of the said ears on opposite sides is a lug G, the same being raised slightly above the upper side of the pail, as indicated, leaving the space F.

H is the cover of the pail, provided with the box-shaped depression I, which extends inward from one edge of the cover and which at its outer side is slightly raised from the bottom of the said depression in the strainer I', so that as the milk flows into the said depression it will pass outward therefrom into the pail through the said strainer and be thoroughly cleansed. The strainer is raised slightly above the bottom of the depression, as before stated, so that a slight quantity of milk may accumulate in the bottom of the depression and thus prevent splashing. The depression increases in depth toward its rear side, owing to the fact that as a general rule the pail is held at an incline while the milking is being done, and hence, owing to the above circumstance, the bottom of the depression will be approximately level while in use. Projecting from opposite sides of the cover are the ears J, which when the cover is turned extend under the locking-lugs G, and thus holds the cover securely in position, so that dirt and foreign matter are effectually excluded, and which, as a matter of fact, serves as a shield for the upper end of the bucket and prevents the escape of milk therefrom in case the pail is upset, excepting so much as may escape backward through the strainer. Handles K are provided on the upper side of the lid for conveniently adjusting the same.

On the rear side of the pail and at its lower end is the vertical guideway L, secured by rivets and provided with the locking setscrew M. Adjustable through this guideway is the post or support N, which is held in the desired vertical adjustment by the said set-screw, and this support or bolt being inserted in the ground or bedding of the stall serves to hold the pail up in position beneath the udder of the cow and out of contact with the stable refuse. The upper end of the support is headed, as indicated at L', in order that the post may not drop from position, and to further guard against such a happening the spring-plate P is secured to the upper end of the guideway with its upper free end bearing inward against the vertically-adjustable post for holding the latter in the desired adjustment while the set-screw is being applied thereto. Thus when the latter is loosened the support may be slid up or down and the said spring will be of sufficient strength to hold it in the desired adjustment until the set-screw is again applied.

Having thus fully described my invention, what I claim, and desire to secure by Letters Patent, is—

1. The combination of a milk-pail, a socket arranged vertically on one side thereof, a standard adjustable vertically through the socket and adapted to depend from the pail to support the same at an incline when in use, a clamping device for holding the standard in the socket, and the spring-holder extending normally over the line of the socket-opening and adapted to be pressed back by the standard when inserted, thus by its pressure forming a temporary hold for the standard after the latter has been adjusted to proper position and until the clamping device is applied, substantially as shown and described.

2. The combination of the pail, the cover, the latter formed with depression I extending from about the center to the outer edge thereof, the same being deepest at the said central portion of the top and decreasing in depth toward the said outer edge, strainer I' in the outer shallower wall of the depression, the vertically-adjustable standard adapted to depend from the outer side of the pail on the side opposite the strainer for supporting the pail when in an operative position at an incline with the depression-bottom substantially level, whereby the milk will be caused to flow from the depression through the strainer, as specified for the purpose described.

In testimony whereof I affix my signature in presence of two witnesses.

GEORGE L. McCALLUM.

Witnesses:
WILLIAM MARSH,
ATWOOD PUTNAM.